United States Patent Office 2,868,659
Patented Jan. 13, 1959

2,868,659

HYDRAULIC CEMENT COMPOSITIONS, INGREDIENTS, AND METHODS OF MAKING SAME

Edward W. Scripture, Jr., St. James, Barbados, British West Indies, Stephen W. Benedict, Cleveland Heights, and Paul B. Jacox, Newburg Heights, Ohio, assignors, by mesne assignments, to American-Marietta Company, Chicago, Ill., a corporation of Illinois No Drawing. Application October 26, 1955
Serial No. 543,024

7 Claims. (Cl. 106—90)

This invention relates to improved hydraulic cement compositions, such as dry cements and concrete or mortar mixes made therefrom, and to ingredients thereof which plasticize the mixes, improve their finishing time, increase their strength at all ages, and lend other desirable properties thereto.

The use of agents such as waste sulfite liquor, for example, to reduce the water-cement ratio of an hydraulic cement mortar or concrete has permitted substantial improvement in the properties of structures formed thereof. Waste sulfite liquor and its derivatives, for example, are highly effective as cement dispersing agents, which is understood to account in part for their plasticizing action, the permissible reduction in the water-cement ratio, and the resultant increase in the strength of the fully hardened cement. Thus, when small amounts of waste sulfite liquor or the dry residue thereof are added to cement mixes, the water-cement ratio may be reduced a very substantial amount and the strength of the concrete at later ages substantially increased.

However, there are disadvantages connected with the use of the agents heretofore proposed which have in some measure limited the commercial acceptance of cement compositions containing them. The use of these dispersing or plasticizing agents tends to reduce the strength at early ages, such as 1 to 7 days, to less than that of a plain mortar or concrete mix. Also, where surface finishing is required, as in constructing floor slabs and the like, these plasticizing agents tend to prolong the time before the cement begins to set and can be surface finished. Moreover, the amounts of these plasticizing agents, in many instances, must be carefully controlled to obtain the optimum results. This may cause difficulties in commercial operations because of the crude measuring methods often employed, the difficulty of obtaining uniform mixing of the small amounts of such additives, etc.

A number of efforts have heretofore been made to provide improved plasticizing agents derived from waste sulfite liquor. Thus, the art has tried various chemical modifications thereof, various purification processes for removing deleterious components therefrom, and the addition thereto of one or more other chemicals for supplementing the action of the plasticizing agents in some respect or for counteracting their objectionable characteristics. In all such instances with which we are familiar, however, elimination of one or more of the above objections has introduced new disadvantages or has reduced the usefulness of these plasticizing agents in other respects, as by reducing the strengths of the cement mixes at later ages, increasing their cost to a prohibitive degree, or simply lowering their general effectiveness for their intended purpose.

The general objectives of the present invention are to provide improved hydraulic cement additives which possess the desirable properties of prior additives derived from waste sulfite liquors but do not have the disadvantages of the prior additives, and to provide hydraulic cement mixes containing the improved additives and methods of utilizing the improved additives.

More specifically, it is an object of this invention to provduce special hydraulic cement mixes which, compared to plain mixes, have improved strength at all ages and an equal or accelerated rate of hardening using a given cement factor and a reduced water-cement ratio, and to produce additives for hydraulic cement mixes which will give the mixes these desirable properties to a higher degree than has heretofore been possible.

Another more specific objective of this invention is to produce such improved hydraulic cement additives, and cement mixes containing the same, by a simple and relatively inexpensive treatment of waste sulfite liquors, and by simple addition of the additives to the cement mixes.

We have found that the above and other objects, which will be apparent from the following description of the invention, may be accomplished by passing commercial waste sulfite liquor, with or without prior neutralization and/or purification, into intimate contact with a mass of activated carbon until a minimum of from about 5% or 10% up to 40% or so of its dissolved solids have been extracted; separating the waste sulfite liquor effluent from the carbon and extracted solids retained thereby; and adding the effluent, or the dissolved solids which can be recovered from the effluent by removing water, to a Portland cement mix in generally the same manner and same amounts heretofore used when employing other waste sulfite liquor derivatives. The activated carbon used for such treatment of waste sulfite liquor becomes exhausted in due course, but may be reactivated in various ways, as by calcining at around 1000° to 1500° C.

The components of the waste sulfite liquor removed by the activated carbon have been difficult to ascertain because of the very complex mixture of many different high molecular weight organic compounds present in the original liquor, many of which have never been definitely identified. We have found that some carbohydrates are removed, even when a substantial portion of the carbohydrates has previously been removed by fermentation, dialysis, or other methods. However, the activated carbon treatment generally does not remove all of the carbohydrates, and very probably does remove some constituents other than carbohydrates.

The waste sulfite liquors of commerce are generally available only in a neutralized form, having been "limed" to convert the acids therein to their calcium salts. The term "waste sulfite liquor" as used herein is intended to include both the neutralized and unneutralized forms thereof. Use of the neutralized liquors is preferred for the purposes of the present invention. However, the same kind of improvement results, whether or not the waste sulfite liquor employed has first been neutralized.

It is desirable that a substantial portion of the carbohydrates be preliminarily removed from the waste sulfite liquor by a suitable process prior to treatment of the liquor with activated carbon. This may be accomplished before the activated carbon treatment by removing the fermentable sugars as disclosed in U. S. Patent 2,435,594 to MacPherson or by dialysis as disclosed in U. S. Patent 2,485,102 to MacPherson et al., or by other purification procedures. Preferably, the fermentable sugars are first removed in accordance with U. S. Patent 2,435,594, after which the activated carbon treatment is performed in accordance with the present invention.

Particularly outstanding results have been obtained by treating the liquor after the preliminary carbohydrate removal successively with an ion exchange resin in accordance with our copending application Serial No. 475,292, filed December 14, 1954, and with activated carbon, or in the reverse order.

The various activated carbons of commerce are by no means equally effective for the purposes of the invention. They appear to differ in their effectiveness both according to the source materials from which they are manufactured and the processes by which they are produced from the various source materials. Thus, the required time of treatment of the liquor with the carbon (residence time) and other conditions, depending on the procedure and apparatus employed, should be varied accordingly.

Since analysis of the activated carbons of commerce has so far failed to disclose the differences in their properties which render some superior to others (other than the effects of differences in particle size and porosity or density, which are not alone responsible), selection of those which give optimum results has necessarily required a great many tests, and only general guides to aid in the selection of the most effective activated carbons can be given. What appear to be the most effective activated carbons are those produced from bituminous coal by finely powdering the coal, pressing the powder with an organic binder into briquettes, crushing and screening to produce particles about ¼" in maximum dimension and smaller, heating at moderate temperature in a rotary kiln to remove as much volatile material as possible without causing agglutination, and then heating in an activator in the presence of steam, carbon dioxide, and oxygen in amounts and at temperatures regulated to form microscopic cracks and crevices throughout the carbon structure by slow burning. As a final step, the resultant material is simply size graded by screening. Other effective activated carbons are those prepared in a generally similar manner from various nut shells (particularly coconut shells), lignite, wood, and other vegetable matter.

For the purposes of the present invention, the most effective particle size of the activated carbon depends in part upon the procedure by which it is to be contacted by the waste sulfite liquor, and the procedures may vary widely, as will be apparent to those skilled in the art.

The most convenient procedure is to pass the liquor downward through a bed of activated carbon in a column of the kind conventionally used for similar liquid-solid reactions. In this case, depending somewhat upon the porosity of the carbon particles, their size may suitably range from the largest that will pass through a U. S. Standard 6-mesh sieve to the smallest that will be held on a U. S. Standard 40-mesh sieve. Preferably, the extreme sieve sizes are about 8 mesh to 30 mesh for economical processing. Too many fines in a bed of the carbon particles in a column unduly impedes the flow of liquor through the bed and results in too great a loss of carbon by burning in the course of reactivating it after it has become exhausted.

The amount of material removed from waste sulfite liquor by the activated carbon seems to be related to the number and sizes of the pores in the carbon particles, as well as the size of the voids between particles. The porosity of a mass of carbon particles may be expressed in terms of the apparent density or bulk density of the dry mass, i. e., weight of the mass in grams divided by the volume of the mass (including voids) in cubic centimeters, when compacted according to standards established in the art. Though particles having an apparent density from as low as 0.4 to as high as 0.7 have been successfully used in a treating column, carbon of the lower density has a tendency to remove too high a percentage of solids from waste sulfite liquor and carbon of the higher density has a tendency to remove too little of the solids when employing presently preferred flow rates through the column. In the former case, it appears that valuable solids in the liquor are removed along with the undesirable ones, so that the effectiveness of the product in a cement mix is impaired, and the product recovery is also reduced. In the latter case, the amount of solids removed is too small to beneficiate the liquor to a degree justifying the cost of the treatment. The preferred apparent density for columnar operation is from about 0.45 to 0.55.

The foregoing particle size and density ranges are based in part upon what has been found by experiment to be a most practical range of flow rates in columnar operation to give adequate residence time with a practical rate of flow while using a carbon bed of practical dimensions. Also, the optimum residence time is dependent to some extent on the solids concentration in the liquor to be treated, a condition that may be varied at will by concentrating or diluting the liquor.

The presently preferred liquor to be treated is one from which the fermentable sugars have first been largely removed by fermentation and which contains from about 8% to 10% dissolved solids. In such cases, we have successfully employed flow rates of from 0.033 liter per minute to 0.17 liter per minute per liter of activated carbon in the bed, the optimum flow rate being adjusted according to the other variables mentioned above, including the effectiveness of the particular grade of carbon employed and its particle size and porosity or apparent density.

With so many variable factors affecting the optimum operating conditions, it will be apparent that the above-stated ranges of carbon particle size and apparent density, and flow rate of liquor through a carbon bed, do not represent limits on the operability of the process of the invention but, rather, merely represent preferred limits for convenient and economical operation in one particular type of liquor treating apparatus for removing from about 5% to about 40% of the solids left in the liquor after the preferred preliminary carbohydrate removal. Being representative of preferred operating conditions when using relatively superior grades of activated carbon for the purposes of the invention, they also should not be assumed to represent optimum conditions when using different grades of activated carbon.

Alternatively, of course, a batch operation may be employed in which the whole of a batch of liquor to be treated is contacted in a suitable container by a mass of the activated carbon, the solid and liquid phases being subsequently separated by means of filtration, decantation, centrifugation, or the like. As is well recognized, however, this is an inefficient procedure compared to the above-mentioned type of continuous operation.

The solids remaining dissolved in the treated liquor may be used directly as a solution of any desired concentration, or may be reduced to the form of a paste or dry powder before use, whichever is more convenient or economical in any particular case. The product may be added to cement or ground with it at the time of its manufacture. Alternatively, and often more conveniently, it may be added, either alone or in admixture with other materials, to the cement, to the aggregate, to the water, or to any other part cr parts of a cement mix, at any time up to completing the mix for placement.

The principal component of waste sulfite liquor solids is lignosulfonic acid, or a salt thereof when the liquor has been neutralized. This component has long been considered to be the active component of such liquors which is responsible for the improvement of hydraulic cement mixes. As noted above, the amounts of various modified forms of waste sulfite liquors which should be used in a particular case may be quite critical, and to materially exceed those limits may have harmful results. The proper amounts to be used heretofore depended, not only upon the effect desired, but also upon the liquor modification involved and the lignosulfonic acid or salt content of such modified liquors.

One of the special advantages of liquors modified in accordance with the present invention is that the adverse effects of prior modified liquors have been greatly minimized. As a result, the adverse effects of using excessive amounts have been greatly reduced and the amounts used are correspondingly less critical.

As little as 0.05% of the solids of the treated liquor, based on the weight of hydraulic cement in a mix, will produce significant improvement in ultimate strength. Below 0.05%, the benefits of the invention may be detectable but become insignificant. Increased amounts up to as much as 1.0% of the treated liquor solids, based on the weight of hydraulic cement, may be used with progressively greater increases in ultimate strength. In all cases, compared to the effects of the solids of untreated liquor, the early strength and finishing time are substantially improved, the early strength approaching and sometimes exceeding that of a plain mix. Though there may be instances in which the use of larger amounts than 1.0% is desired, the additional improvements achieved with larger amounts are less than proportional to the increases in the additions and are generally uneconomical. Too great an excess, of course, can be harmful and should be avoided. In general, from about 0.25% to about 0.75% of the treated liquor solids, based on the weight of hydraulic cement in a mix, is preferred.

When unpurified calcium lignosulfonate is added to a concrete mix in amounts which effectively disperse the cement and reduce the amount of water required to produce a plastic concrete mix, the setting of the cement and the early rate of hardening are retarded. It has been the practice to add to the mix, along with the waste sulfite liquor, an accelerator, such as calcium chloride. With the use of partially purified waste sulfite liquors, such as those secured from fermentation processes which remove more or less of the fermentable carbohydrates, this retarding effect is greatly reduced; but when the larger proportions of such liquors are used, the retarding effect persists. Thus, while it is possible by certain prior art liquor treatments to reduce the amount of calcium chloride needed to maintain normal setting time and early rate of hardening, some calcium chloride is still required. The use of calcium chloride in concrete is not generally regarded as desirable, and some published data indicate that calcium chloride aggravates the alkali-aggregate reaction in concrete. We have found that the treatment of waste sulfite liquors with activated carbon in accordance with this invention reduces the need for calcium chloride by substantially counteracting the retarding effects of the solids of liquors which have not been so treated, while also securing the maximum benefits from dispersion of the cement.

However, it is sometimes desired to increase the rate of hardening of cement mixes beyond that which can be achieved with the treated waste sulfite liquors of this invention. Calcium chloride or other known accelerators may be used for this purpose in conjunction with these treated liquors. The desirable amounts of accelerator are usually from about 0.1% to 2% or 2.5%, by weight of the cement.

Additional ingredients, such as fly ash and other finely divided materials, may also be present in the concrete to improve workability or provide pozzuolanic action. If it is desired to further increase the ultimate strength of the concrete or mortar, it may be desirable also to incorporate a derivative of benzoic acid, such as those disclosed for this purpose in United States Patents No. 2,264,336, 2,360,517, 2,360,518, and 2,360,519. The preferred derivative of benzoic acid is salicylic acid or a salt thereof.

The practice of using air entraining agents in cement mixes is now well understood and commonly used for increasing the resistance of hardened concrete to freezing and thawing and to scaling on de-icing with calcium chloride and the like. The treated liquors of this invention do entrain air, and the amount of entrained air frequently falls within the desirable range of 3% to 6% by volume. Under some conditions, or in some mixes, these liquors may not entrain the desired amount of air, and it may be desired to entrain more air by the use of additional air entraining agents, such as an alkylphenyl sulfonate, described in U. S. Patent No. 2,593,492, or other air entraining agents such as those described in U. S. Patents Nos. 2,225,149, 2,225,150, 2,420,144, 2,236,251, and others.

Similarly, other additives may be included in cement mixes prepared in accordance with this invention for the purposes for which they are normally employed. The expression "consisting essentially of" recited in the claims is intended to be used accordingly.

In the light of the foregoing general disclosure of this invention, the practical application and advantages thereof will be better understood from the following specific examples in which cement mixes illustrating the practice of the invention and the benefits achieved thereby are compared to plain cement mixes and mixes containing waste sulfite liquor purified only by the now widely used fermentation process. The plain mixes (no additive) in the examples were all made with a cement factor of 5.5 (i. e., 5.5 sacks per cu. yd. of concrete).

Since one of the great advantages of the use of waste sulfite liquor in any of its commercial forms has been the reduction in cement factor that can be made without loss of ultimate strength, the mixes to which any form of waste sulfite liquor solids were added were all made with a cement factor of 4.7 (about a 15% reduction). Since some of these latter mixes tended to entrain an excessive amount of air, which (though having certain beneficial effects) reduces the ultimate strength, minute quantities of tributyl phosphate (an air detraining agent) were added where necessary to keep the amount of entrained air no higher than 6.5% and thereby eliminate differences in entrained air as a material factor in the results.

In all cases where waste sulfite liquor solids were used, they were added in the same amount of 0.5% of the particular form of waste sulfite liquor solids by weight based on the weight of the cement, and, in each example, the liquors treated with carbon and the untreated liquor were from the same source. The same cement and the same aggregate mixture were used throughout each individual example. Water cement ratios were measured in terms of gallons per sack of cement.

Each cement mix tested was cast into a number of test cylinders and, in each case, the compressive strength data represents averages of two tests at 1 day and three tests at 28 days.

EXAMPLE I

Three types of cement mixes were prepared. Mix A was a plain mix (no additive) consisting of Portland cement, aggregate (including sand), and water. Mix B was the same as mix A, except for the reduced cement factor and the addition of dried solids of neutralized, fermented waste sulfite liquor. Mix C was the same as mix B except that the dried waste sulfite liquor solids were obtained from an effluent resulting from passing the same liquor downward through a bed of activated carbon at a rate selected to remove 31.4% of the dissolved solids (leaving 68.6% of the dissolved solids in the effluent). In this case, the activated carbon was a commercial grade made from bituminous coal in the manner described above. The particles all passed through an 8-mesh sieve and were retained by a 30-mesh sieve and had an apparent density of 0.52. Pertinent mix data for these mixes and compressive strength test data obtained as described above are given in Table 1.

*Table 1*

| Mix | Water-Cement Ratio | Slump (inches) | Percent Air | Compressive Strength, lbs./sq. in. | |
|---|---|---|---|---|---|
| | | | | 1 Day | 28 Days |
| A | 6.30 | 4 | 1.7 | 630 | 5,160 |
| B | 5.34 | 4.5 | 3.7 | 460 | 6,170 |
| C | 5.19 | 4.5 | 3.7 | 610 | 6,410 |

EXAMPLE II

Example I was repeated except that a number of different mixes $C_1$, $C_2$, $C_3$, $C_4$, and $C_5$ were prepared in the same manner as mix C in Example I, but using different activated carbons to remove different quantities of solids from the waste sulfite liquor. Corresponding mix data for the several mixes and compressive strength test data are given in Table 2. The particular kind of activated carbon used, the range of its particle size in terms of the limiting U. S. Standard sieve designations, and the percentage of the liquor solids retained in the effluent (based on solids content just before the carbon treatment) are given in Table 3.

*Table 2*

| Mix | Water-Cement Ratio | Slump (inches) | Percent Air | Compressive Strength, lbs./sq. in. | |
|---|---|---|---|---|---|
| | | | | 1 Day | 28 Days |
| A | 6.24 | 4 | 2.1 | 500 | 4,680 |
| B | 5.35 | 4 | 4.7 | 160 | 4,910 |
| $C_1$ | 5.16 | 4.5 | 6.0 | 360 | 5,530 |
| $C_2$ | 5.30 | 3 | 4.0 | 320 | 5,530 |
| $C_3$ | 5.21 | 4 | 5.4 | 330 | 5,040 |
| $C_4$ | 5.57 | 4 | 5.1 | 340 | 5,450 |
| $C_5$ | 5.57 | 3.5 | 5.0 | 500 | 5,660 |

*Table 3*

| Mix | Kind of Activated Carbon | | | Percent Orig. Solids in Effluent |
|---|---|---|---|---|
| | Source Material | Max. Sieve Size | Min. Sieve Size | |
| $C_1$ | Bituminous coal | 8 | 30 | 69.9 |
| $C_2$ | Coconut shell | 12 | 30 | 73.8 |
| $C_3$ | do | 12 | 30 | 74.7 |
| $C_4$ | Wood | 8 | 20 | 87.4 |
| $C_5$ | Bituminous coal | 12 | 40 | 64.9 |

EXAMPLE III

Example I was repeated except that fermented waste sulfite liquor from a different manufacturing source than that used in Examples I and II was employed and different mixes $C_6$, $C_7$, and $C_8$ were prepared in the same manner as mix C in Example I using different commercial grades of activated carbons made from bituminous coal. The range of particle sizes of the carbon used in connection with mixes $C_6$, $C_7$, and $C_8$, in terms of sieve sizes as previously given, was 8-mesh to 30-mesh for mixes $C_6$ and $C_8$ and was 10-mesh to 30-mesh for mix $C_7$. Corresponding mix data for the several mixes, compressive strength test data, and the percentage of original solids retained in the effluent from which the liquor solids were obtained for mixes $C_6$, $C_7$, and $C_8$ are given in Table 4.

*Table 4*

| Mix | Water-Cement Ratio | Slump (inches) | Percent Air | Compressive Strength, lbs./sq. in. | | Percent Orig. Solids in Effluent |
|---|---|---|---|---|---|---|
| | | | | 1 Day | 28 Days | |
| A | 6.26 | 3.5 | 2.1 | 420 | 4,540 | |
| B | 5.49 | 6 | 6.3 | 180 | 4,960 | |
| $C_6$ | 5.45 | 4.5 | 4.0 | 280 | 5,650 | 67.7 |
| $C_7$ | 5.40 | 4.5 | 3.8 | 360 | 5,410 | 77.7 |
| $C_8$ | 5.31 | 4.5 | 5.5 | 320 | 5,370 | 63.3 |

EXAMPLE IV

The tests of this example are given to illustrate the further improvement that may be secured by treating a waste sulfite liquor (after preliminary removal of a substantial portion of carbohydrates) successively with an ion exchange resin and with activated carbon, in that order or in the reverse order.

The results of the tests on mixes A, B, and $C_6$ from Example III are reproduced below along with the results of two comparison tests of mixes $C_9$ and $C_{10}$.

In preparing waste sulfite liquor solids for use in a mix $C_9$, the liquor used in preparing mix B was first passed through a bed of the same, ungenerated "Amberlite IRA-410" anion exchange resin (strongly basic, high molecular weight, polymeric electrolyte having quaternary amine functional groups) employed in Examples 1, 2, and 3 of our copending application Serial No. 475,292, filed December 14, 1954 (referred to above), the same procedure also being employed. The effluent from the ion exchange resin bed was then passed through a bed of the same activated carbon used in preparing mix $C_6$, the same procedure being employed. The dried solids from the effluent obtained from the activated carbon treatment were incorporated in mix $C_9$, which was otherwise identical with mix $C_6$.

In preparing waste sulfite liquor solids for use in another mix $C_{10}$, the order of the ion exchange resin and activated carbon treatments was simply reversed. In other respects, mixes $C_9$ and $C_{10}$ were identical.

Corresponding mix data for the several mixes and compressive strength test data are given in Table 5.

*Table 5*

| Mix | Water-Cement Ratio | Slump (inches) | Percent Air | Compressive Strength, lbs./sq. in. | |
|---|---|---|---|---|---|
| | | | | 1 Day | 28 Days |
| A | 6.26 | 3.5 | 2.1 | 420 | 4,540 |
| B | 5.49 | 6 | 6.3 | 180 | 4,960 |
| $C_6$ | 5.45 | 4.5 | 4.0 | 280 | 5,650 |
| $C_9$ | 5.47 | 3 | 4.1 | 810 | 5,700 |
| $C_{10}$ | 5.44 | 3.5 | 5.0 | 670 | 5,700 |

The 1-day strengths for mixes $C_9$ and $C_{10}$ involving solids from liquor treated both with the ion exchange resin and with activated carbon even exceeded the 1-day strengths for the plain mix A by nearly 100% in the case of mix $C_9$ and by better than 50% in the case of mix $C_{10}$, while also producing a substantial improvement in 28-day strengths compared to both mix B and mix $C_6$.

In evaluating the foregoing examples, the effects of the invention on the early and late strengths and how such effects may be achieved should be apparent from the data given in the examples. As regards the effect of the invention on finishing times, it should be understood that the relative early strengths of different mixes, at say 1 day, are not necessarily correct indications of the relative delays required before such mixes can be surface finished.

In general, the finishing delays are considerably prolonged by the addition of waste sulfite liquor solids and, to nearly the same degree, by addition of the solids from the prior art modified or purified liquors. Treatment of the plain and modified liquors of the prior art in accordance with the present invention, in addition to improving both early and ultimate strengths, also effects a substantial reduction in finishing time. In some instances, particularly when the activated carbon and ion exchange treatments are combined as in Example IV, the finishing time may closely approach that for a plain mix.

From the foregoing description and examples of the present invention, it will be appreciated that we have provided a method of treating waste sulfite liquors in a simple and inexpensive manner whereby the value of the liquor solids as hydraulic cement additives is greatly enhanced in that the beneficial effects of plain waste sulfite liquor solids are obtained to a high degree while greatly reducing or subsantially eliminating the prior disadvantages.

While the invention has been described and illustrated by reference to various specific materials and procedures, it is to be understood that the invention is not restricted to the particular materials and procedures selected for that purpose. Numerous variations in such details can be employed, as will be appreciated by those skilled in the art.

Having described our invention, we claim:

1. An hydraulic cement mix consisting essentially of Portland cement, sufficient water to effect hydraulic setting of the cement and produce a workably plastic mix, and from about 0.05% to 1.0% based on the weight of cement, of the solids of a waste sulfite liquor effluent resulting from passing a waste sulfite liquor into intimate contact with activated carbon until between about 5% and 40% of the solids in said liquor have been removed.

2. An hydraulic cement mix consisting essentially of Portland cement, sufficient water to effect hydraulic setting of the cement and produce a workably plastic mix, and from about 0.05% to 1.0% based on the weight of cement, of the solids of a waste sulfite liquor effluent resulting from passing a waste sulfite liquor into intimate contact with an ion exchange resin and with activated carbon until between about 5% and 40% of the solids in said liquor have been removed.

3. An hydraulic cement mix according to claim 1 in which said waste sulfite liquor is the product resulting from the removal of a substantial portion of the carbohydrates from limed waste sulfite liquor.

4. An hydraulic cement mix according to claim 1 in which said activated carbon is in the form of microscopically porous granules substantially all of which will pass through a U. S. Standard 6-mesh sieve and be retained on a U. S. Standard 40-mesh sieve, and said waste sulfite liquor is passed through a bed of such granules.

5. An hydraulic cement mix according to claim 1 in which said waste sulfite liquor is the product resulting from the removal of a substantial portion of the carbohydrates from substantially neutralized waste sulfite liquor by contact with activated carbon in the form of microscopically porous granules substantially all of which will pass through a U. S. Standard 6-mesh sieve and be retained on a U. S. Standard 40-mesh sieve, and said waste sulfite liquor is passed through a bed of such granules.

6. An hydraulic cement mix according to claim 1 in which said waste sulfite liquor is the product resulting from the removal by fermentation of a substantial portion of the carbohydrates from substantially neutralized waste sulfite liquor, and said activated carbon is derived from bituminous coal and is in the form of microscopically porous granules substantially all of which will pass through a U. S. Standard 6-mesh sieve and be retained on a U. S. Standard 40-mesh sieve, and said waste sulfite liquor is passed through a bed of such granules.

7. An hydraulic cement mix according to claim 2 in which said waste sulfite liquor is the product resulting from the removal of a substantial portion of the carbohydrates from substantially neutralized waste sulfite liquor.

References Cited in the file of this patent

UNITED STATES PATENTS

| | | |
|---|---|---|
| 2,229,311 | Scripture | Jan. 21, 1941 |
| 2,435,594 | McPherson | Feb. 10, 1948 |
| 2,546,650 | Nijboer | Mar. 27, 1951 |
| 2,609,882 | Morgan | Sept. 9, 1952 |
| 2,710,255 | Blaricom | June 7, 1955 |